(12) United States Patent
Hanus

(10) Patent No.: US 9,074,789 B2
(45) Date of Patent: Jul. 7, 2015

(54) METHOD AND APPARATUS TO PROVIDE VENTILATION FOR A BUILDING

(71) Applicant: John P. Hanus, Hartland, WI (US)

(72) Inventor: John P. Hanus, Hartland, WI (US)

( * ) Notice: Subject to any disclaimer, the term of this patent is extended or adjusted under 35 U.S.C. 154(b) by 0 days.

(21) Appl. No.: 14/187,381

(22) Filed: Feb. 24, 2014

(65) Prior Publication Data

US 2014/0248832 A1 Sep. 4, 2014

Related U.S. Application Data

(60) Provisional application No. 61/851,135, filed on Mar. 4, 2013.

(51) Int. Cl.
| | |
|---|---|
| *F24F 7/02* | (2006.01) |
| *F24F 13/00* | (2006.01) |
| *F24F 13/02* | (2006.01) |
| *F24F 11/00* | (2006.01) |
| *F24F 13/04* | (2006.01) |
| *F16K 1/00* | (2006.01) |

(52) U.S. Cl.
CPC ............... *F24F 13/0236* (2013.01); *F16K 1/00* (2013.01); *F24F 11/0001* (2013.01); *F24F 13/04* (2013.01); *F24F 2221/186* (2013.01)

(58) Field of Classification Search
CPC ..... F24F 13/0236; F24F 13/04; F24F 11/0001; F24F 1/00
USPC .......... 454/242, 239, 251, 252, 237; 251/120, 251/301; 137/625.44, 625.45, 625.46
See application file for complete search history.

(56) References Cited

U.S. PATENT DOCUMENTS

| | | | | |
|---|---|---|---|---|
| 2,862,434 | A * | 12/1958 | Edwards | 454/252 |
| 4,391,321 | A * | 7/1983 | Thunberg | 165/54 |
| 7,497,771 | B2 * | 3/2009 | Choi et al. | 454/252 |
| 7,594,539 | B2 * | 9/2009 | Isaka | 165/248 |
| 2006/0154596 | A1 * | 7/2006 | Meneely, Jr. | 454/256 |
| 2006/0270335 | A1 * | 11/2006 | Kim et al. | 454/237 |
| 2008/0073439 | A1 * | 3/2008 | Lestage et al. | 236/44 A |
| 2011/0036541 | A1 * | 2/2011 | Takada et al. | 165/59 |
| 2012/0094590 | A1 * | 4/2012 | Lee et al. | 454/251 |
| 2013/0237140 | A1 * | 9/2013 | Contreras et al. | 454/239 |
| 2013/0281001 | A1 * | 10/2013 | Yamaguchi et al. | 454/249 |

* cited by examiner

*Primary Examiner* — Kristen Matter

(57) ABSTRACT

An improved method and apparatus allows fresh air to be introduced into a building through action of a special manifold which directs air entering the building through the furnace combustion feed tube to be introduced into the interior atmosphere of the building, while air from the interior of the building is directed to the furnace and ultimately exhausted to the exterior of the building.

8 Claims, 4 Drawing Sheets

METHOD AND APPARATUS TO PROVIDE VENTILATION FOR A BUILDING

CROSS REFERENCE TO RELATED APPLICATIONS

Field of the Invention

The invention relates to fresh air ventilation for a building. More specifically, the invention relates to fresh air ventilation for a building through utilization of the heating and cooling system of the building and wherein the building features a heating system which includes a blower fan to expel exhaust gases from the furnace combustion chamber and wherein combustion air is provided from outside the building through a pipe or other dedicated ductwork.

BACKGROUND OF THE INVENTION

Contemporary architects have designed buildings to be 'tighter' to retain heat energy by eliminating drafts and air leakage. As such, there is a need to provide adequate ventilation into a building to offset contaminated air generated by chemicals and pollution inherent in the indoor environment. These pollutants include everything from household cleaners and other chemicals to outgases from laminated plywood and particle board construction materials. As such, a need has been established to provide fresh external air to be included in the air contained in a building.

In addition to tighter building construction, energy efficiency requirements have induced manufacturers to produce furnaces that convert as much fuel energy as possible into heat to be used in a building. By concentrating most of the heat energy within the furnace, the cooler exhaust gases cannot easily flow out of the chimney through convection. For this reason, furnace manufacturers have included a blower fan to expel the exhaust gases from the furnace and in most cases, to draw combustion air from outside the building.

To provide fresh air, many buildings include high efficiency ventilation systems that feature 'heat recovery ventilators' which recover heat energy through exchange of air from inside the building with air from outside the building by passing the air through a radiator type heat exchanger, an action designed to heat the air coming into the building with the radiant temperature of the air leaving the building as shown in U.S. Pat. No. 7,073,566, U.S. Pat. No. 6,450,244 and U.S. Pat. No. 6,575,228. These systems typically are stand alone designs that do not require action from the furnace or air conditioner to operate. Because of their exclusive function, these systems can be quite costly to purchase and install. None of the systems utilize the furnace combustion fan as a ventilation component to expel interior air from the building.

As a solution to this need for an efficient and inexpensive ventilation system, the present invention will provide fresh air introduction into a building while exhausting stale air from the building in a simple and cost effective manner.

Modern buildings that include forced air heating and cooling systems typically incorporate a high efficiency furnace to supply heat. Most high efficiency furnaces include a secondary heat exchanger which has the effect of reducing the temperature of the gases exhausted from the furnace combustion chamber. Because of the low temperature of the exhaust gases, these types of furnaces require a fan to supply air for furnace burner combustion and to remove the exhaust gases from the furnace to the exterior of the building, which is typically accomplished through a PVC pipe, while combustion air from outside of the building into the furnace is typically supplied through a second PVC pipe. In operation, outside air is drawn into the furnace combustion chamber, travels through the heat exchanger or exchangers and is ultimately exhausted through a PVC pipe to the outside of the building through the action of the exhaust fan included in the furnace.

BRIEF SUMMARY OF THE INVENTION

The present invention provides interior air management in a building by allowing outside 'fresh' air to be brought into the building in the most efficient and cost effective manner. The present invention may have the effect on reducing humidity in a building when the system is in the heating mode, while also balancing air pressure between the exterior and interior atmosphere of a building.

The present invention describes a ventilation system which includes a manifold comprising:
- a port connected to an outside 'fresh' air source.
- a port connected to the furnace combustion air inlet pipe of a high efficiency furnace.
- a port connected to the cold air return ductwork of a forced air heating system.
- a port open to air from the interior atmosphere of the building or connected to the cold air return ductwork of a forced air heating system.
- a gate or gates to direct the desired air flows.
- a control system to remotely adjust the gate or gates to direct the air flows.

In relation to the above descriptions, incoming air for the furnace combustion chamber can move via 2 different pathways. In a first pathway, air is drawn into the furnace in the typical manner, that being through a pipe from outside of the building into the combustion chamber. Alternately in a second pathway, air is drawn into the furnace from inside the building with replacement air being drawn from outside of the building from an area remote from the exhaust from the furnace, into the cold air return ductwork. In this mode, the combustion air would be drawn from the interior of the building from an area near the manifold or from special ductwork which pulls air from a remote location inside the building, or interior air could be siphoned off the cold air return ductwork of the building heating/ventilation system. If the combustion air is drawn from the cold air return, it will be drawn from a point 'upstream' from where the fresh exterior air enters the cold air return. In a third, combination mode, combustion air could be drawn from both the interior of the building and the exterior of the building, thereby blending or mixing various amounts of outside air with inside air which is in turn drawn into the furnace combustion chamber, while in cooperation, varying amounts of outside air enters the cold air return ductwork of the building. Dampers may be required to control air speed and air volume appropriate for the furnace combustion burner in an effort to prevent air from 'backdrafting' or moving in the wrong direction and to block outside air from entering the building when the furnace is not operating.

In a further embodiment, fresh air could be introduced into the building while the furnace is off and a ventilation or air conditioning fan is operating. This fresh air introduction could be accomplished by operating the combustion blower fan of the heating system to exhaust the stale air and draw in fresh air, albeit with the combustion burner not operating and thereby not producing heat. In a secondary embodiment, a separate fan could be used to provide air movement to the outside of the building when the system is in the cooling or ventilation mode. Additional electric fans may also be required to assist in air movement.

It should be noted that with any manifold comprising the invention, a heat transfer element or heat recovery system such as a finned radiator, wherein incoming air would be preheated with the radiant temperature of the air leaving the building, could be utilized to increase efficiency.

Operation of any gates or dampers which control the direction of the fresh air and/or combustion air could be controlled manually, or in a preferred embodiment, by automatic controls. In a non-limiting embodiment, the manifold controls could be included within or near the thermostat controls for the building with possible air supply choices being 'fresh' to include outside air or 'recirculate' to recycle the existing interior air. From a visual perspective, the air choices are similar to choices available in automobile ventilation systems.

The present invention would be used with a high efficiency furnace that includes forced air ductwork or could be used with a high efficiency furnace wherein a separate ventilation ductwork system is utilized. This type of furnace and separate ductwork could be incorporated when using a hot water radiant heating system or other heating system which utilizes an exhaust fan for the combustion burner and wherein ventilation and/or cooling is provided through a separate ductwork system.

Additional modifications and additions could be incorporated without deviating from the scope of the invention.

BRIEF DESCRIPTION OF THE VIEWS OF THE DRAWING

The accompanying drawings are meant to describe non-limiting designs for a manifold which could be used to facilitate the air transfers previously described. It should also be noted that elements of a manifold could comprise separate 'sub manifolds' wherein the gates directing air to the various ports could be separate from each other, and thereby control the air flows independently, without deviating from the scope of the invention. The views in FIG. 2-7 are included as partial views of the manifold in that the upper cover for the manifold and control elements for the movable air control gate are not shown in the interest of clarity. All arrows shown on the drawings depict air flows into and out of the manifold and the cold air return ductwork of the building and are included as a visual aid.

DETAILED DESCRIPTION OF A PREFERRED EMBODIMENT

Figure 1:
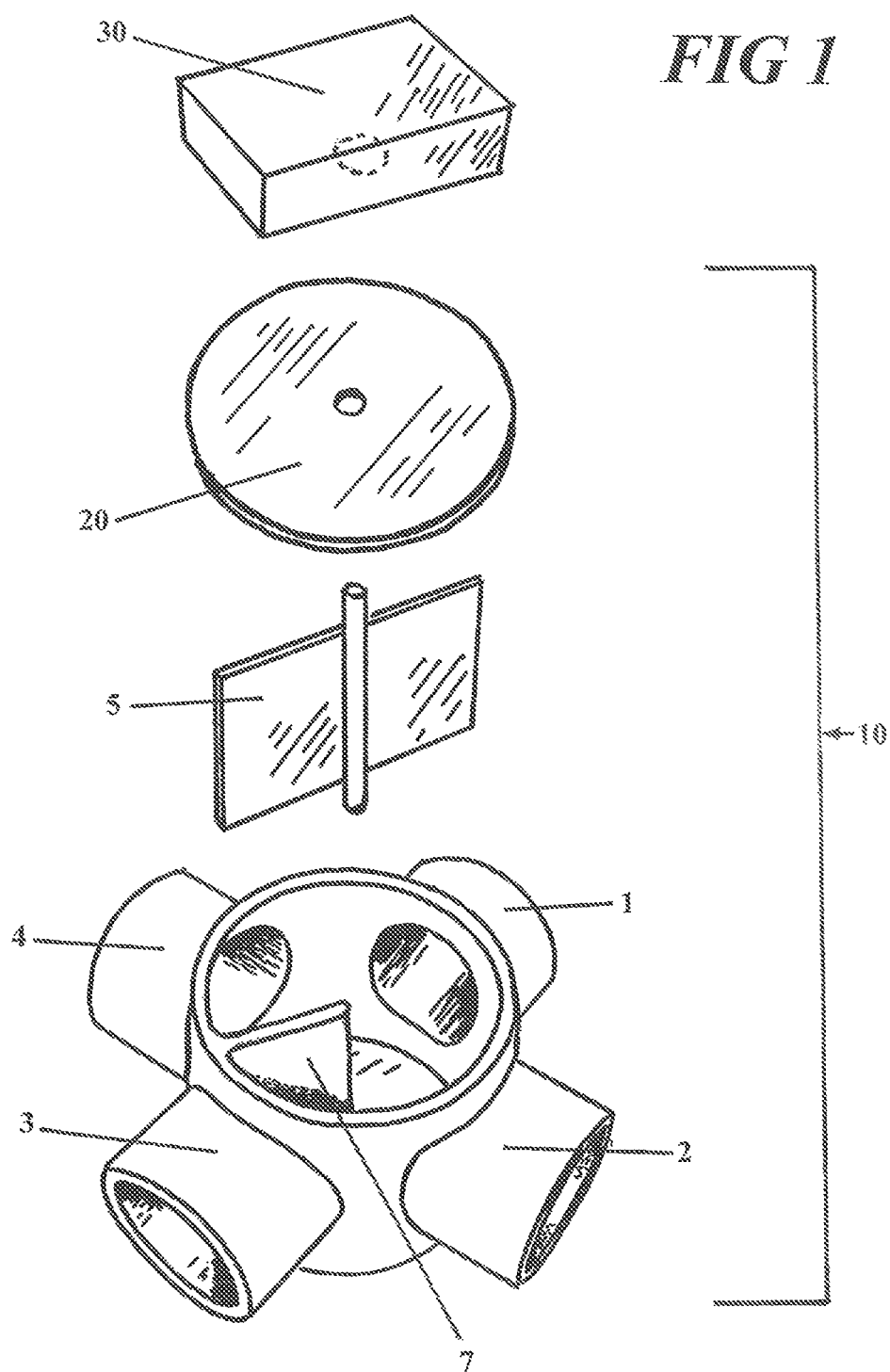
FIG. 1 describes a manifold in expanded perspective view showing the manifold body with a plurality of ports, a movable air control gate and including a cover and a representation of a control mechanism not shown in the other drawings.

As shown in FIGS. 2-7, various air flows could be directed through action of a special manifold (10) which is designed to facilitate the direction of the air flows through adjustment of a movable air control gate (5).

In reference to FIG. 1-7, a manifold (10) comprises 4 air channels including: a fresh air inlet port (1) which is designed to allow fresh air from outside of the building into the manifold (10), a furnace combustion air outlet port (2) which directs fresh air toward the furnace combustion burner, a interior air outlet port (4) which directs air toward the inside of the building and an interior air inlet port (3) which directs air from inside of the building into the manifold (10). Within manifold (10), a movable air control gate (5) is located and designed in such manner as to create a substantially sealed barrier which will have the effect of sealing off the undesired air pathways and to eliminate or control leakage between the various ports during use.

Figure 2:
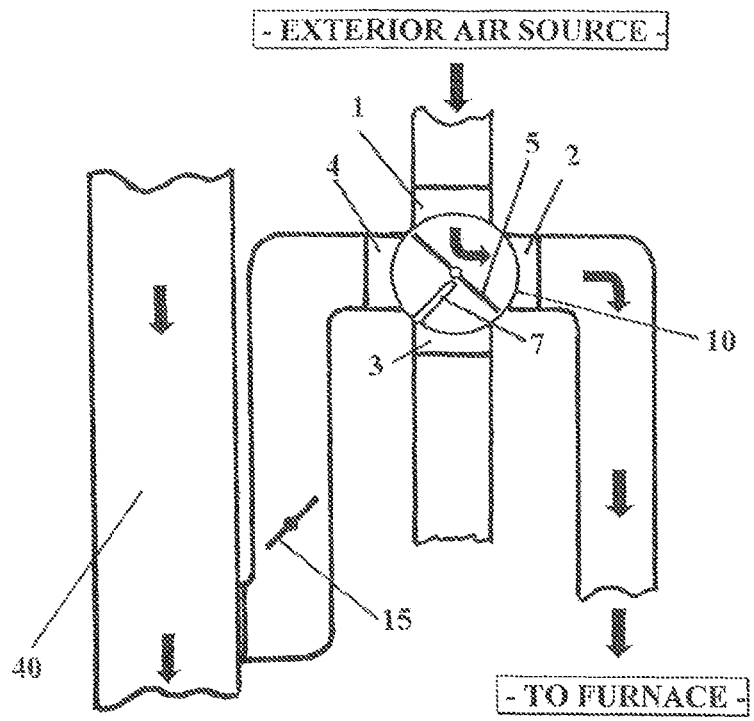
FIG. 2 describes a plan view of the invention wherein exterior fresh air is directed to the furnace combustion burner fan.
Figure 3:
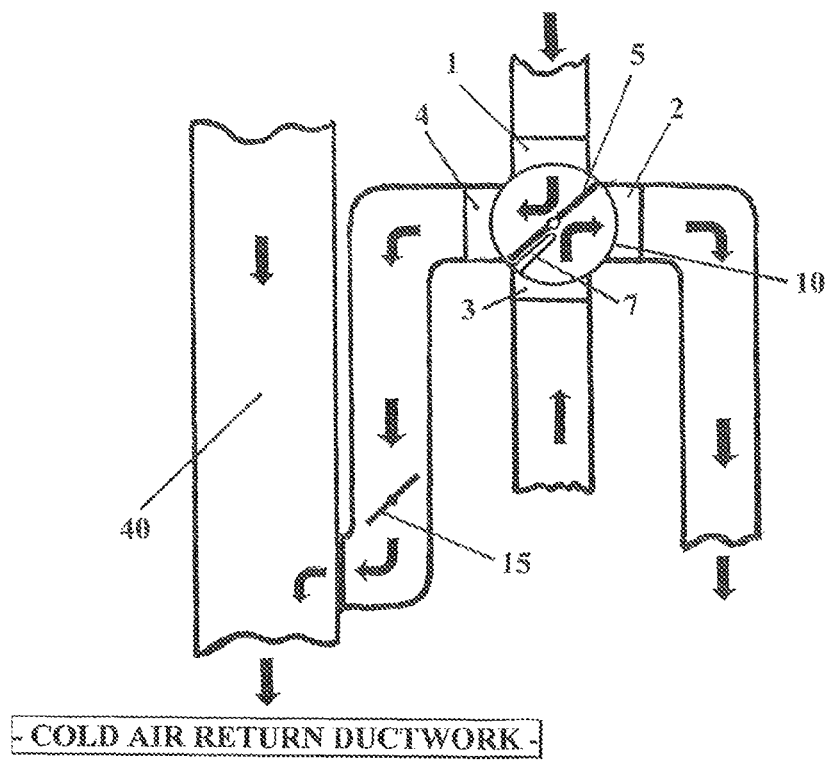
FIG. 3 describes a plan view wherein exterior fresh air is directed to the interior of the building and wherein air from a separate interior location is directed to the furnace combustion burner fan.
Figure 4:
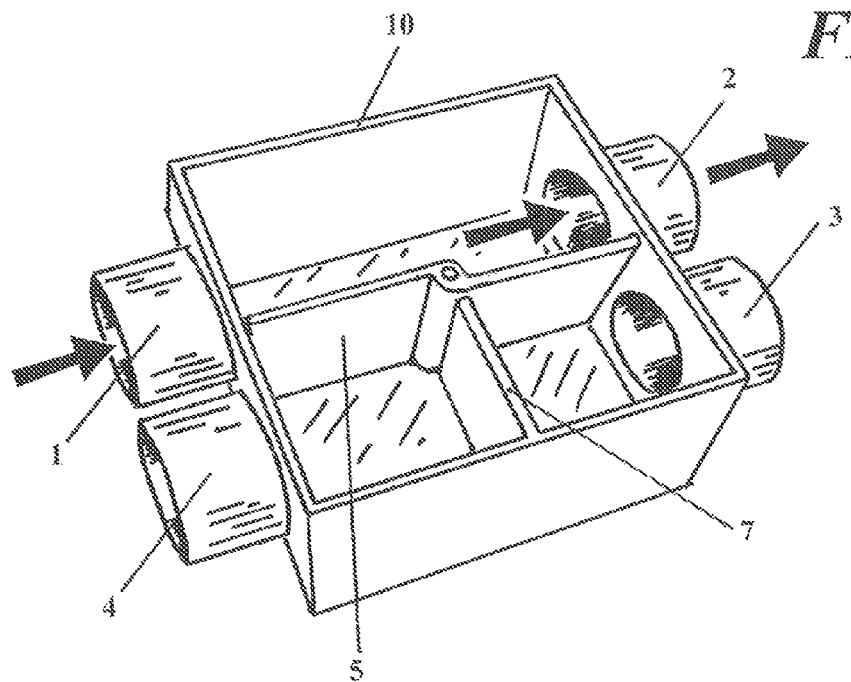
FIG. 4 describes a perspective view of a manifold wherein exterior fresh air is directed to the furnace combustion burner fan.
Figure 5:
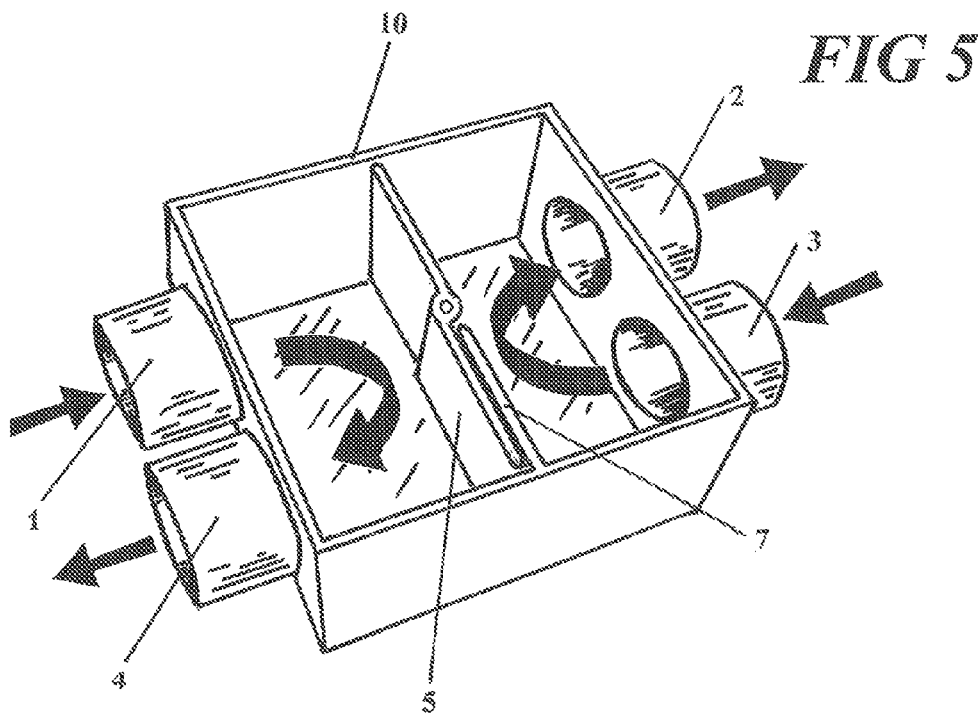
FIG. 5 describes a perspective view of the manifold wherein exterior fresh air is directed to the interior of the building and wherein air from a separate interior location is directed to the furnace combustion burner fan.
Figure 6:
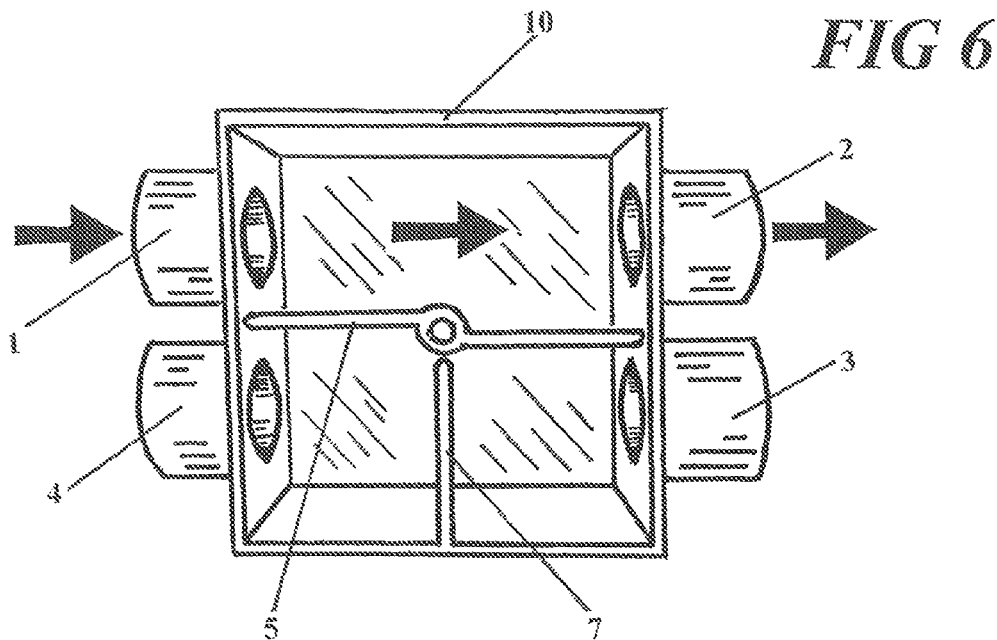
FIG. 6 describes an elevated view of the manifold wherein exterior fresh air is directed to the furnace combustion burner fan.
Figure 7:
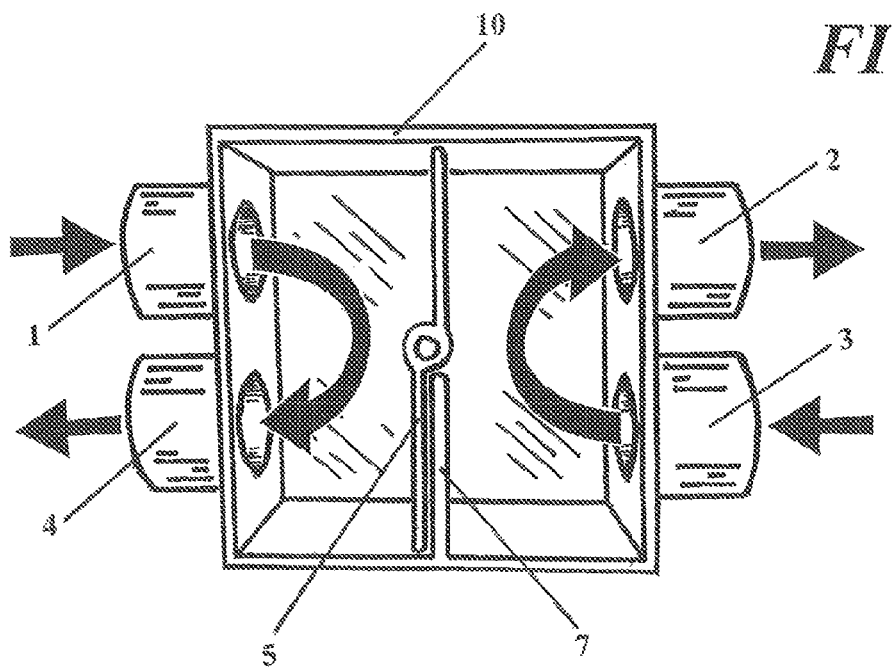
FIG. 7 describes an elevated view of the manifold wherein exterior fresh air is directed to the interior of the building and wherein air from a separate interior location is directed to the furnace combustion burner fan.

In operation, manifold (10) and movable air control gate (5) will operate in 2 basic modes. In a first mode through positioning of the movable air control gate (5) and as shown in FIGS. 2, 4, & 6, outside air enters the manifold through fresh air inlet port (1) and continues toward the furnace combustion burner through furnace combustion burner port (2). This technique allows the furnace combustion air to be supplied from outside of the building in the same manner as existing high efficiency furnace designs. In a secondary mode through repositioning of the movable air control gate (5) and as shown in FIGS. 3, 5 & 7 outside air is directed through fresh air inlet port (1) and directed to the inside of the building through interior air outlet port (4), with furnace combustion air drawn from the inside of the building through fresh air inlet port (3) and continues to furnace combustion air outlet port (2) and is thereby directed to the furnace combustion burner fan. In this manner, air from outside of the building is introduced into the building while air from inside the building is exhausted through the fan induced exhaust from the furnace combustion burner fan.

In regard to the non-limiting drawings of a manifold (10) which is designed to facilitate air movement and as best shown in breakdown view in FIG. 1 which includes a cover (20) and a representation of a control mechanism (30). In operation as shown in FIGS. 2-7, a movable air control gate (5) located inside the manifold (10) will, in a first embodiment, be positioned to allow outside air to be directed to the furnace combustion air outlet port (2) wherein it is further directed to the inlet pipe for the combustion fan of the furnace. In a second embodiment, as best shown in FIGS. 3, 5 & 7, when fresh air is desired to be introduced into the building, the movable air control gate (5) located in the manifold (10) will be moved to a position wherein outside air is directed to the cold air return ductwork (40) of the building, while combustion air for the furnace is provided through interior air inlet port (3) from a location inside the building near the manifold or through a special duct from a location in the building which will be most efficient in creating an air exchange, or air could be siphoned off the cold air return ductwork (40) of the building from a point 'upwind' from the position where the fresh air is introduced into the cold air return ductwork (40) of the building through fresh air outlet port (4). In the case of the cold air return being used for combustion air, the fresh air introduction point is positioned downwind from the point where air is being siphoned off the cold air return ductwork of the building to prevent the fresh air from being 're-siphoned' back into the combustion air pipe of the furnace. Introduction of exterior air through the fresh air outlet port (4) into the cold air return ductwork (40) allows the air to be filtered, heated (or cooled) and treated before entering the living area.

In a third embodiment, the adjustable air control gate (5) could be moved to a position which would allow a variable amount of fresh air to enter the cold air return ductwork (40) of the building through interior air outlet port (4) and in coordination, a variable amount of fresh air and interior air is supplied to the furnace combustion air outlet (2) and then to the furnace combustion fan. The movable air control gate (5) could be positioned so that exterior air and interior air sources are blended prior to delivery to the combustion air outlet port (2) and ultimately to the combustion burner fan of the furnace.

In a preferred but not limiting embodiment, the movable air control gate (5) comprises a generally rectangular panel being of sufficient height and width as to seal off the channels to effectively direct air to travel in preferred directions and having an axle located in the general middle of the rectangular panel upon which the panel is pivoted. Damper wall (7) is included in the manifold (10) to prevent air from following an inappropriate path, which could be described as 'looping' or backdrafting between ports. Dampers (15) may also be included in the pipe or pipes connecting the manifold to the cold air return ductwork to allow adjustment to the amount of fresh air entering the building.

In operation, the movable air control gate (5) is positioned through mechanical means which are in turn controlled through electromechanical or physical means which is described as device (30) and shown in FIG. 1, to be positionable to allow either air from outside of the building or air from inside of the building to be directed to the furnace combustion burner wherein it will be used to produce the heat for the building. After the combusted air completes passage through the furnace, the air is then exhausted to the outside of the building.

In a preferred but not limiting embodiment, a user will operate a switch, possibly incorporated into the thermostat located within the living quarters of the building, which will send a signal to the control mechanism (30) for the movable air control gate (5) located within the manifold (10). The switch could have positions marked 'fresh' which would open the manifold to allow all or a variable amount of exterior air into the building through the cold air return, or 'recirculate' which would have the effect of recycling the interior air and wherein no exterior air is added to the interior of the building. The action of switching the direction of the air flows may be manually operated or it could be automatically controlled, possibly based on humidity level, or could be time sensitive to open the manifold to allow inclusion of fresh air at predetermined time intervals.

I Claim:

1. A method for providing exterior fresh air into an interior of a building, the method comprising:
    providing a manifold comprising:
        an exterior air inlet port that allows the exterior air into the manifold,
        an interior air inlet port that allows air from the interior of the building into the manifold,
        an interior air outlet port that allows air from the manifold to enter the interior of the building,
        a furnace combustion fan outlet port that allows air from the manifold to pass to a furnace combustion fan of a heating system of the building and thence to an exterior of the building,
        a movable gate that directs air within the manifold by being adjustable through a range of positions, and
        a control means for operating the moveable gate;
    adjusting a position of the moveable gate into one of two main positions, the two positions including a first position and a second position; and
    directing air through the manifold;
    wherein when the moveable gate is in the first position the exterior air enters the manifold through the exterior air inlet port and exits the manifold through the furnace combustion fan outlet port such that air passes through a furnace combustion chamber of the furnace and subsequently passes to the exterior of the building;
    and wherein when the moveable gate is in the second position the exterior air enters the manifold through the exterior air inlet port and exits the manifold through the interior air outlet port and subsequently passes to the interior of the building while the air from the interior of the building enters the manifold through the interior air inlet port and exits the manifold through the furnace combustion fan outlet port and subsequently passes to the furnace combustion fan of the heating system of the building, such that the exterior air is introduced into the interior of the building while air from the interior of the building is used to provide air for furnace combustion and which is exhausted to the exterior of the building through action of the furnace combustion fan.

2. The method of claim 1 wherein air entering the interior of the building through the manifold is introduced into a cold air return ductwork of the heating system of the building.

3. The method of claim 2 wherein air directed to the furnace combustion fan through the manifold is drawn from the cold air return ductwork of the heating system of the building.

4. The method of claim 1 wherein air directed to the furnace combustion fan through the manifold is drawn from a cold air return ductwork of the heating system of the building.

5. The method of claim 1 wherein a barrier wall is included between the interior air inlet port and the interior air outlet port in the manifold.

6. The method of claim 5 wherein air entering the interior of the building through the manifold is directed to a cold air return ductwork of the heating system of the building.

7. The method of claim 6 wherein air directed to the furnace combustion fan is drawn from the cold air return ductwork of the building.

8. The method of claim 5 wherein air directed to the furnace combustion fan through the manifold is drawn from a cold air return ductwork of the heating system of the building.

* * * * *